(12) United States Patent
Shi et al.

(10) Patent No.: US 6,185,331 B1
(45) Date of Patent: Feb. 6, 2001

(54) SWITCHED-CURRENT FUZZY PROCESSOR FOR PATTERN RECOGNITION

(75) Inventors: Bingxue Shi; Gu Lin, both of Beijing (CN)

(73) Assignee: United Microelectronics Corp., Hsin-Chu (TW)

( * ) Notice: Under 35 U.S.C. 154(b), the term of this patent shall be extended for 0 days.

(21) Appl. No.: 09/045,139

(22) Filed: Mar. 20, 1998

(51) Int. Cl.$^7$ ............................. G06K 9/00; G06F 15/18
(52) U.S. Cl. ............................. 382/181; 382/224; 706/1
(58) Field of Search .................................. 382/186, 187, 382/198, 228, 229, 100, 181, 224, 155; 706/1, 2–9; 701/27, 40, 44

(56) References Cited

U.S. PATENT DOCUMENTS

| | | | |
|---|---|---|---|
| 4,644,325 | * | 2/1987 | Miller .................................... 340/347 |
| 5,544,279 | * | 8/1996 | Li et al. .................................... 395/3 |
| 5,802,204 | * | 9/1998 | Basehore .................................... 382/186 |

* cited by examiner

Primary Examiner—Bhavesh Mehta

(57) ABSTRACT

A switched-current fuzzy processor for pattern recognition is provided, which is specifically designed to operate in current mode for high performance. The switched-current fuzzy processor includes means for decoding a feature input into a set of binary feature signals; an array of MFGs, coupled to the decoding means, for obtaining a set of current outputs whose magnitudes are proportional to the values of the feature signals respectively; weight-adjusting means, coupled to the MFG array, for applying a predetermined weight factor in binary form to the output currents from the MFG array; summing means, coupled to the weight-adjusting means, for summing up each set of currents from each column of the MFGs in the MFG array to thereby obtain a total value for the currents therefrom; and a maximum-value determination circuit, coupled to the summing means, capable of obtaining the one of the currents with the maximum magnitude from the summing means. The foregoing switched-current fuzzy processor features that the circuits in the simulation unit are all based on the switched-current mode of operation without the need to use current-to-voltage conversion means, thus allowing simplified circuit structure and high precision in signal processing with high performance; and that the provision of the weight-adjusting and summing means in the switched-current fuzzy processor in place of the MIN-MAX means in the prior art allows the switched-current fuzzy processor to be adjustable in weight with simplified operation.

8 Claims, 6 Drawing Sheets

SWITCHED-CURRENT FUZZY PROCESSOR FOR PATTERN RECOGNITION

BACKGROUND OF THE INVENTION

1. Field of the Invention

This invention relates to fuzzy processors, and more particularly, to a switched-current fuzzy processor for pattern recognition which is specifically designed to operate in current mode for high performance.

2. Description of Related Art

A fuzzy processor is a logic processing means which processes logic signals based on conditional rather than absolute true or false states. The results obtained from a fuzzy processor are less definite than those obtained with strict classical logic, but fuzzy logic applies to a wide range of cases, such as pattern recognition.

Most conventional fuzzy processors are based on a MIN-MAX operation. For applications in pattern recognition, the MIN-MAX operation is considered unsatisfactory. Other fuzzy processors are based on digital circuitry which is complex in structure. A type of fuzzy processor, called switched-voltage fuzzy processor, utilizes transistor switching elements to implement the fuzzy logic for pattern recognition. This type of fuzzy processor, however, has the drawbacks of requiring a large layout area to implement, a low operating speed, and a complex circuit structure to implement.

SUMMARY OF THE INVENTION

It is therefore an objective of the present invention to provide a switched-current fuzzy processor for pattern recognition, which is specifically designed to operate in current mode without the need to use current-to-voltage converting means for the benefits of simplified structural complexity and high precision and performance in computation.

It is another an objective of the present invention to provide a switched-current fuzzy processor for pattern recognition, which utilizes a weighted summing operation with a variably adjustable weight factor so the switched-current fuzzy processor can be adapatively modified for application in a wide range of cases.

It is still another objective of the present invention to provide a switched-current fuzzy processor for pattern recognition which is fully compliant with the standard complementary metal oxide semicondutor (CMOS) technology for modular integration with very large scale integration (VLSI) integrated circuits.

It is yet another objective of the present invention to provide a switched-current fuzzy processor for pattern recognition, which is designed in a module that allows it to be easily expanded in functionality.

In accordance with the foregoing and other objectives of the present invention, a switched-current fuzzy processor for pattern recognition is devised. The switched-current fuzzy processor of the invention includes the following constituent elements:

(a) means for decoding a feature input into a set of binary feature signals;

(b) an array of membership function generators (MFGs), coupled to the decoding means, for obtaining a set of current outputs whose magnitudes are proportional to the values of the feature signals respectively;

(c) weight-adjusting means, coupled to the MFG array, for applying a predetermined weight factor in binary form to the output currents from the MFG array;

(d) summing means, coupled to the weight-adjusting means, for summing up each set of currents from each column of the MFGs in the MFG array to thereby obtain a total value for the currents therefrom; and (e) a maximum-value determination circuit, coupled to the summing means, capable of obtaining the choosing of the current with the maximum magnitude from the summing means.

The foregoing disclosed switched-current fuzzy processor of the invention features that the circuits in the simulation unit (i.e., the MFG array, the weight-adjusting means, the summing means, and the maximum-value determination circuit) all being based on the switched-current mode of operation without the need to use current-to-voltage conversion means, thus allowing the switched-current fuzzy processor to have simplified circuit structure and high precision in signal processing with high performance. Moreover, the provision of the weight-adjusting and summing means in the switched-current fuzzy processor of the invention in place of the MIN-MAX means in the prior art allows the fuzzy processor of the invention can adjust weight in a simple manner.

BRIEF DESCRIPTION OF DRAWINGS

The invention can be more fully understood by reading the following detailed description of the preferred embodiments, with reference made to the accompanying drawings, wherein.

DETAILED DESCRIPTION OF PREFERRED EMBODIMENTS

Figure 1:
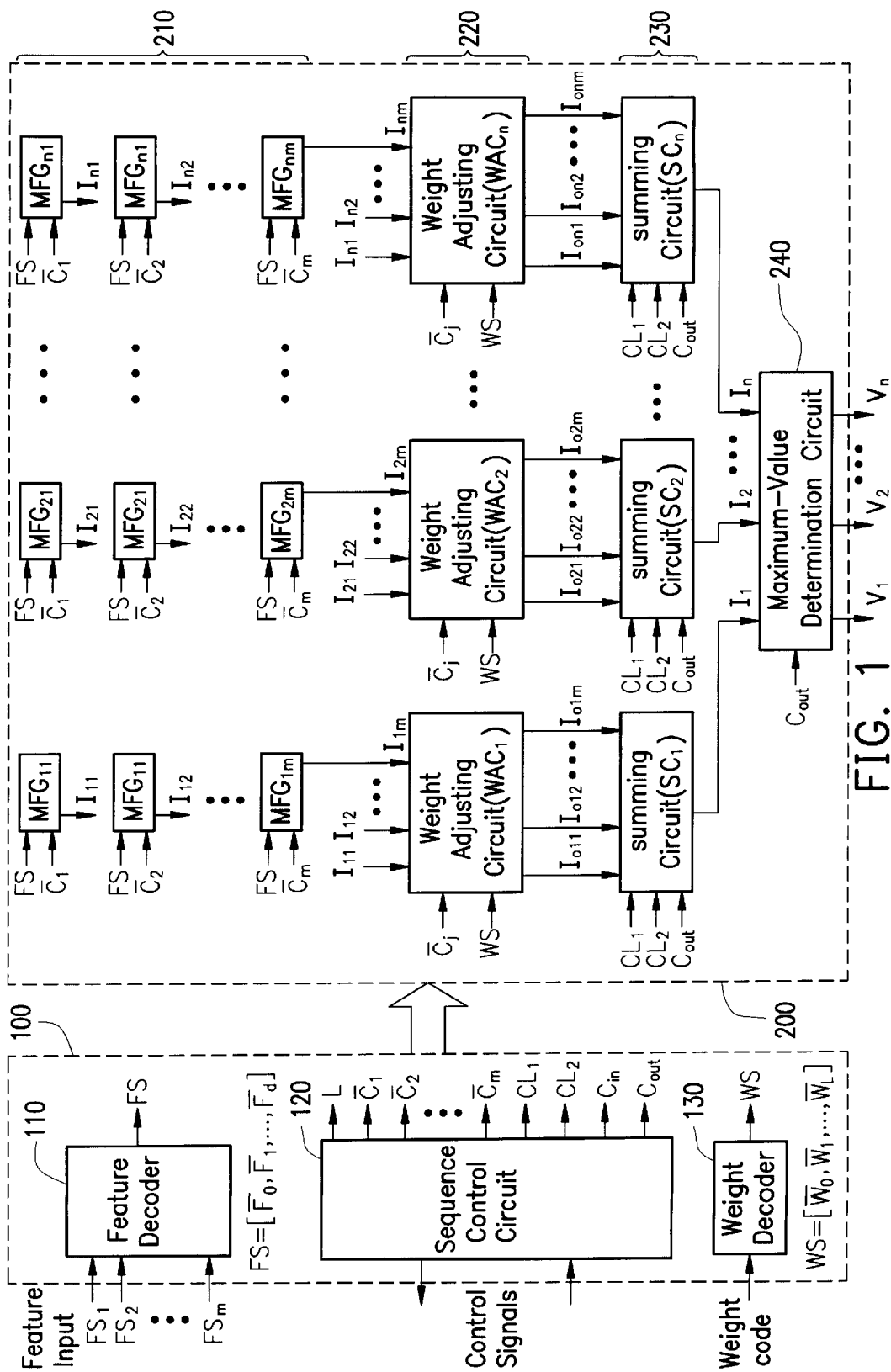
FIG. 1 is a schematic block diagram of the switched-current fuzzy processor according to the invention.

FIG. 1 is a schematic block diagram of the switched-current fuzzy processor according to the invention. As shown, the switched-current fuzzy processor of the invention includes two main units: a digital unit 100 and a simulation unit 200. The digital unit 100 further includes a feature decoder 110, a sequence control circuit 120, and a weight decoder 130. The simulation unit 200 includes an n×m array 210 of membership function generators $MFG_{ij}$, for i=1 to n and j=1 to m; an array 220 of weight-adjusting circuits $WAC_i$, for i=1 to n, which are coupled to the MFG array 210, an array 230 of summing circuits $SC_i$, for i=1 to n, which are coupled to the weight-adjusting circuit array 220, and a maximum-value determination circuit 240 coupled to the summing circuit array 230.

Figure 2:
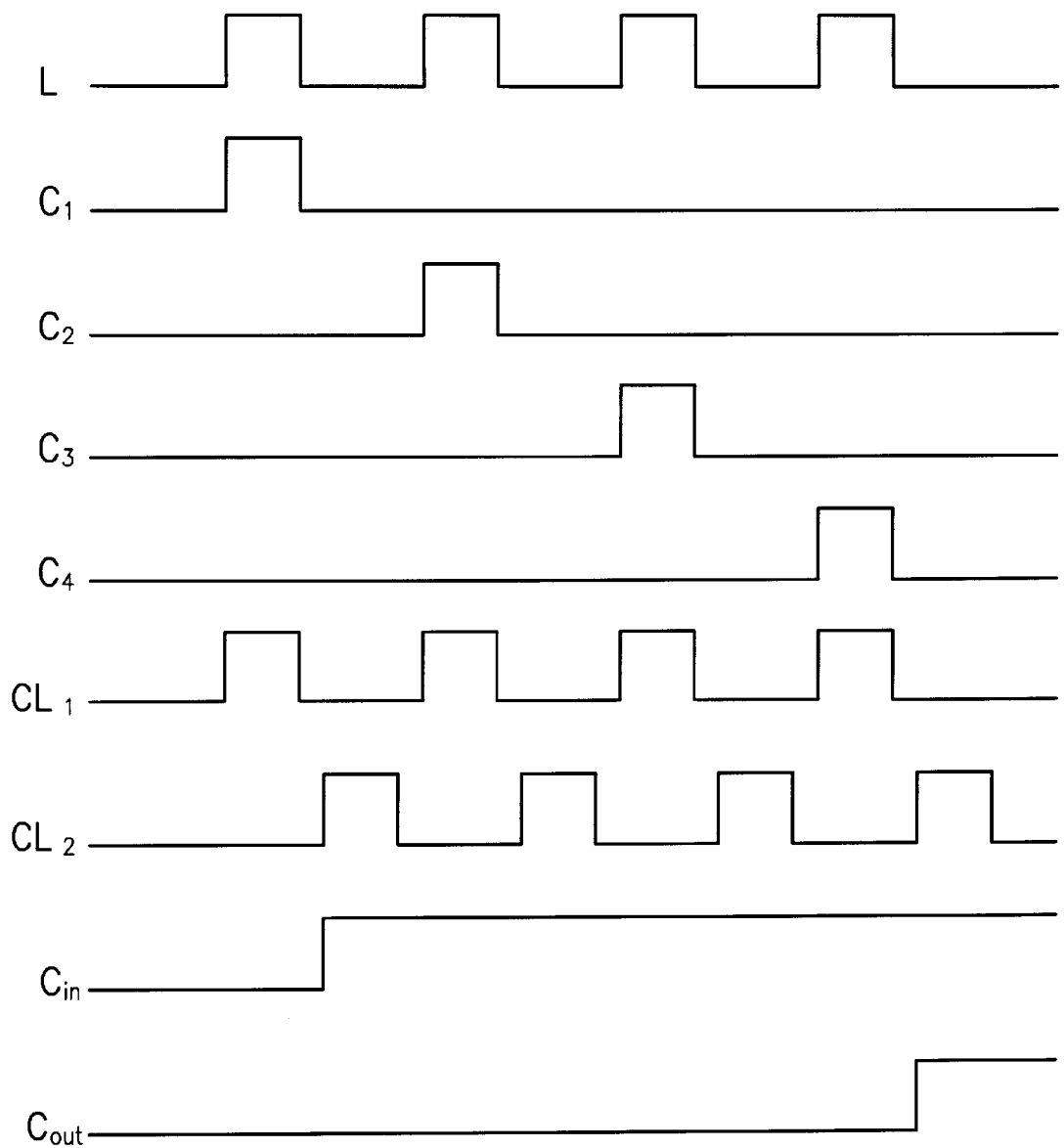
FIG. 2 is a waveform diagram showing the timing of various clock signals and enable signals used in the switched-current fizzy processor of the invention.

The logic operations of the switched-current fuzzy processor of FIG. 1 are under control by a number of clock signals L, $CL_1$, $CL_2$, and enable signals [$\overline{C}_1$, $\overline{C}_2$, ... $\overline{C}_m$], $C_{in}$, and $C_{out}$, with the waveforms thereof schematically illustrated in FIG. 2 for the case of m=4. The clock signal L is a periodic pulse rain with a fixed rate. The clock signals $CL_1$, $CL_2$ are two pulse trains with the same rate as the clock signal L but appearing in a complementary manner in that when $CL_1$, is at a high-voltage logic state, $CL_2$ is at a low-voltage logic state; and vice versa. The four (for m=4) enable signals [$\overline{C}_1$, $\overline{C}_2$, $\overline{C}_3$, $\overline{C}_4$] are each a single pulse appearing in a successive manner in synchronization with the pulses in the clock signal L. Further, the enable signal $C_{in}$ is switched from the low-voltage logic state to the high-voltage logic state when the first pulse in $CL_2$ appears and thereafter maintained at the high-voltage logic state. The enable signal $C_{out}$ is switched from the low-voltage logic state to the high-voltage logic state at the falling edge of the appearance of the last enable signal $\overline{C}_4$. These control and enable signals are together generated by the sequence control circuit 120 and used to control the operations of the various constituent circuit parts of the fuzzy processor of the invention.

The feature decoder 110 is used to receive a set of original feature signals $FS_i$, for i=1 to m, which are then decoded by the feature decoder 110 in a time-sharing manner under the control of the clock signal L. The time-shared output of the feature decoder 110 is denoted by FS. Assume each original feature signal $FS_i$, for i=1 to m, is a k-bit binary value and the decoded version of the feature signal, i.e., FS, is a (d+1)-bit binary value and denoted by [$\overline{F}_0$, $\overline{F}_1$, ..., $\overline{F}_d$]. The output FS of the feature decoder 110 is sent to all of the $MFG_{ij}$, for i=1 to n and j=1 to m, in the MFG array 210; meanwhile the enable signals [$\overline{C}_1$, $\overline{C}_2$, ..., $\overline{C}_m$] are respectively sent to the m rows of MFG array 210. As a result of this configuration, when the output FS of the feature decoder 110 is the first feature signal $FS_1$, the first row of the MFG array 210, i.e., $MFG_{11}$, $MFG_{21}$, ..., and $MFG_{n1}$ is enabled by the first enable signal $\overline{C}_1$, whereby only the first feature signal $FS_1$ is processed at this time; when the output FS of the feature decoder 110 is the second feature signal $FS_2$, the second row of the MFG array 210, i.e., $MFG_{12}$, $MFG_{22}$, ..., and $MFG_{n2}$ are enabled by the second enable signal $\overline{C}_2$, whereby only the second feature signal $FS_2$ is processed at this time; and so forth until the output FS of the feature decoder 110 is the last feature signal $FS_m$, and the last row of the MFG array 210, i.e., $MFG_{1m}$, $MFG_{2m}$, ..., and $MFG_{nm}$ are enabled by the last enable signal $\overline{C}_m$ to process the last feature signal $FS_m$.

Figure 3:
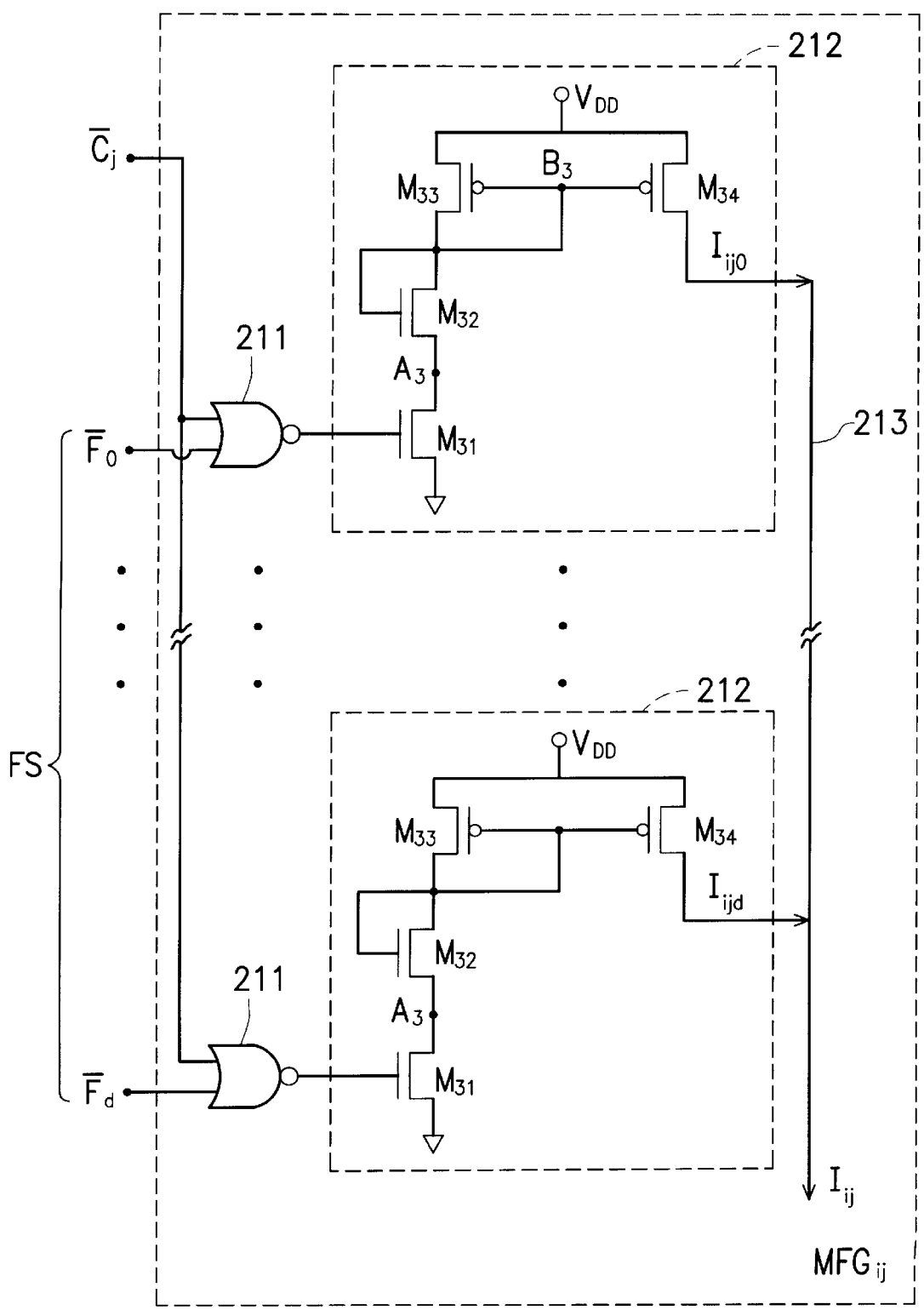
FIG. 3 is a schematic circuit diagram showing the inside structure of each of the MFGs in an MFG array used in the switched-current fuzzy processor of FIG. 1.

All of the $MFG_{ij}$, for i=1 to n and j=1 to m, in the MFG array 210 are structured in the same manner as illustrated in FIG. 3. $MFG_{ij}$, $1 \leq i \leq n$, $1 \leq j \leq m$, will be enabled by the associated enable signal $\overline{C}_j$, $1 \leq j \leq m$, from the sequence control circuit 120 to process the current output of the feature decoder 110 (i.e., the (j)th feature signal $FS_j$) to thereby obtain a current output $I_{ij}$ (hereinafter referred to as MFG currents) whose magnitude is proportional to the value of the feature signal $FS_j$.

As shown in FIG. 3, each $MFG_{ij}$ includes an array of (d+1) NOR gates 211, each having a first input end connected to the enable signal $\overline{C}_j$ and a second input end connected to one of the bits [$\overline{F}_0$, $\overline{F}_1$, ..., $\overline{F}_d$] of the current output feature signal $FS_j$ from the feature decoder 110 and an array of (d+1) associated proportional current mirrors 212 coupled respectively to the NOR gates 211. These proportional current-mirror circuits 212 are each structured in the same manner, including the following elements: a first NMOS transistor M31 whose gate is connected to the output of the associated one of the NOR gates 211, whose source is connected to the ground, and whose drain is connected to a first node A3; a second NMOS transistor M32 whose source is connected to the first node A3 connected to the drain of the first NMOS transistor M31 and whose gate and drain are tied together and connected to a second node B3; a third NMOS transistor M33 whose source and gate are tied together and connected to the second node B3 and whose drain is connected to a system voltage $V_{DD}$; and a PMOS transistor M34 whose gate is connected to the second node B3, whose source is connected to the system voltage $V_{DD}$, and whose drain is taken as the output of each proportional current mirror 212. The output currents of the (d+1) proportional current mirrors 212 are respectively denoted by $I_{ij0}$, ..., and $I_{ijd}$, corresponding respectively to the bits [$\overline{F}_0$, $\overline{F}_1$, ..., $\overline{F}_d$] of the received feature signal. These output currents $I_{ij0}$, ..., $I_{ijd}$ are connected to a common output line 213. According to Kirchhoff's current law, the output current $I_{ij}$ from the common output line 213 is the sum of the currents $I_{ij0}$, ..., $I_{ijd}$.

Figure 4:
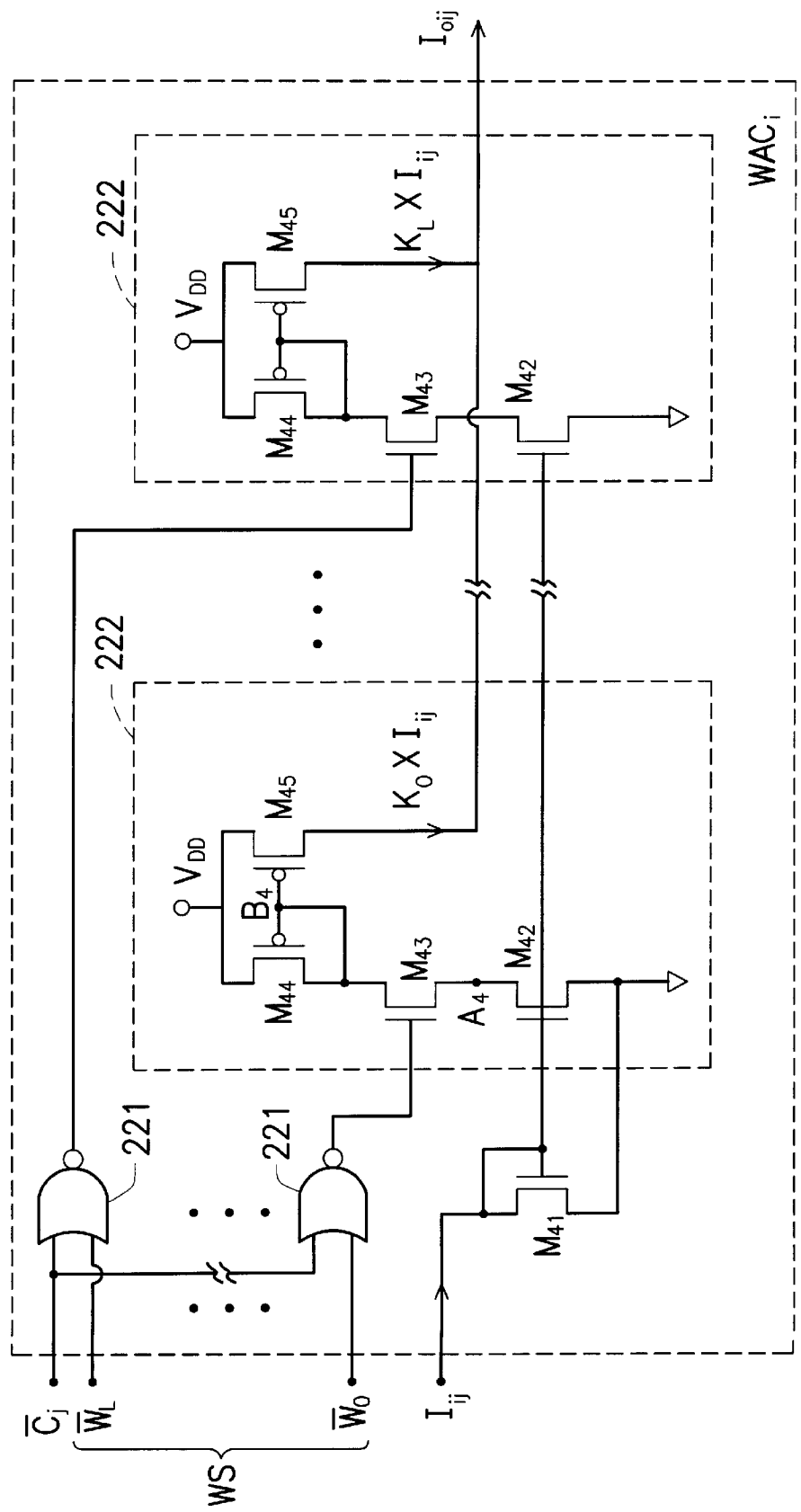
FIG. 4 is a schematic diagram showing the inside structure of each individual weight-adjusting circuit in a weight-adjusting circuit array used in the switched-current fuzzy processor of FIG. 1.

Referring back to FIG. 1, the output currents from all $MFG_{ij}$, i=1 to n and j=1 to m, in the array 210 (i.e., the currents $I_{ij}$, i=1 to n and j=1 to m) are sent to the weight-adjusting circuit array 220 which includes an array of n weight-adjusting circuits $WAC_i$, i=1 to n and j=1 to m. Each $WAC_i$ is used to apply a predetermined weight factor WS to each of the currents $I_{ij}$, i=1 to n and j=1 to m so as to obtain the corresponding weighted currents $I_{O\,ij}$, i=1 to n, j=1 to m. Each of the weight-adjusting circuits $WAC_i$, i=1 to n and j=1 to m in the array 220 has the same circuit structure as illustrated in FIG. 4. The weight factor WS is a binary value which is the decoded output of the weight decoder 130, and which is transferred along with the associated enable signal $\overline{C}_j$ to all of the individual weight-adjusting circuits $WAC_i$, i=1 to n and j=1 to m in the array 220.

As shown in FIG. 4, each individual weight-adjusting circuit $WAC_i$ includes an array of (L+1) NOR gates 221, each having a first input end connected to the enable signal $\overline{C}_j$ and a second input end connected to one of the bits [$\overline{W}_0$, $\overline{W}_1$, ..., $\overline{W}_L$] of the weight factor WS; and an array of associated proportional current mirrors 222 coupled respectively to the NOR gates 221. Under the control of the enable signal $\overline{C}_j$, the MFG output currents from the same column in the MFG array 210 are sent to and processed by each weight-adjusting circuit $WAC_i$, in the array 220, in a time-sharing manner. The input port of $WAC_i$ to receive these currents is denoted by $I_{ij}$ in FIG. 4.

These proportional current mirrors 222 are each structured in the same manner, including a common first NMOS transistor M41 whose gate and drain are tied together and connected to the input port $I_{ij}$, and whose source is connected to the ground; a second NMOS transistor M42 whose gate is connected to the crate of the first NMOS transistor M41, whose source is connected to the ground, and whose drain is connected to a first node A4; a third NMOS transistor M43 whose gate is connected to the output of the associated one of the NOR gates 221, whose source is connected to the first node A4 connected to the drain of the second NMOS transistor M42, and whose drain is connected to a second node B4; a first PMOS transistor M44 whose gate and drain are tied together and connected to the second node B4, and whose source is connected to the system voltage $V_{DD}$; and a fifth PMOS transistor M45 whose gate is connected to the second node B4, whose source is connected to the system voltage $V_{DD}$, and whose drain is taken as the output of each proportional current mirror 212. The output currents of the (L+1) proportional current mirrors 222 are respectively denoted by $K_0 \times I_{ij}$, ..., $K_L \times I_{ij}$, where $K_0, \ldots K_L$ are the weight value contributed by the bits $[F_0, F_1, \ldots, F_d]$ of the weight factor WS respectively. These output currents $K_0 \times I_{ij}, \ldots, K_L \times I_{ij}$ are connected to a common output line 223. According to Kirchhoff's current law, the output current $I_{ij}$ from the common output line 213 (i.e., the weighted current output from each weight-adjusting circuit $WAC_i$) is the sum of the currents $K_0 \times I_{ij}, \ldots, K_L \times I_{ij}$.

Referring back to FIG. 1, the weighted currents $I_{O\ ij}$, i=1 to n and j=1 to m, are then sent to the summing circuit array 230 which includes an array of n summing circuits $SC_i$, i=1 to n, each being used to sum up the weighted currents from the same column in the MFG array 210. That is, the first summing circuit $SC_1$ is used to sum up the weight currents $I_{O\ 1j}$, for j=1 to m; the second summing circuit $SC_2$ is used to sum up the weight currents $I_{O\ 2j}$, for j=1 to m; and so forth.

Figure 5:
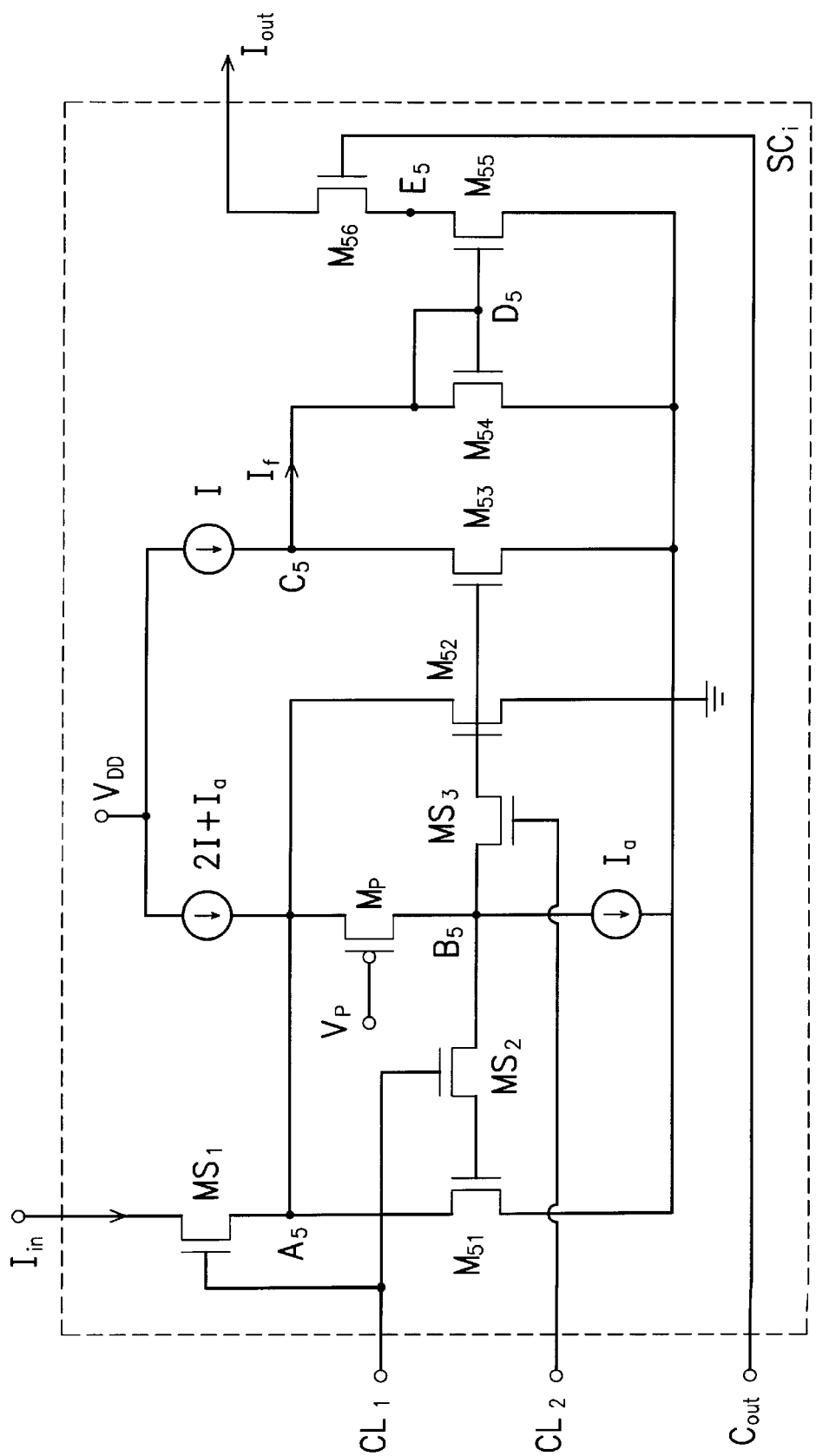
FIG. 5 is a schematic diagram showing the inside structure of each individual summing circuit in a summing circuit array used in the switched-current fuzzy processor of FIG. 1.

All of the summing circuits $SC_i$, i=1 to n, in the array 230 have the same circuit structure as shown in FIG. 5, which includes an input port $I_{in}$ which takes on the sequentially outputted weighted currents $I_{O\ ij}$, i=1 to n and j=1 to m. Moreover, each summing circuit $SC_i$ takes the clock signals $CL_1$, $CL_2$ and the enable signal $C_{out}$ as control signals.

Each summing circuit $SC_i$ includes three switching MOS transistors MS1, MS2, MS3, six NMOS transistors M51, M52, M53, M54, M55, M56, and a PMOS transistor Mp. The ON/OFF states of the first and second switching MOS transistors MS1, MS2 are controlled by $CL_1$, while the ON/OFF state of the third switching MOS transistor MS3 is controlled by $CL_2$.

The first switching MOS transistor MS1 is connected between the input port $I_{in}$ and a first node A5, with the ON/OFF state thereof controlled by $CL_1$. The second switching MOS transistor MS2 is connected between the gate of the first NMOS transistor M51 and a second node B5, with the ON/OFF state thereof also controlled by $CL_1$. The third switching MOS transistor MS3 is connected between the second node B5 and both the gate of the second NMOS transistor M52 and the gate of the third NMOS transistor M53.

The PMOS transistor Mp has a gate connected to a fixed voltage $V_p$, a source connected to the first node A5, and a drain connected to the second node B5. The first NMOS transistor M51 has a gate connected to the second switching MOS transistor MS2, a drain connected to the first node A5, and a source connected to the ground. The second NMOS transistor M52 has a gate connected to both the third switching MOS transistor MS3 and the gate of the third NMOS transistor M53, a drain connected to the first node A5, and a source connected to the ground.

The third NMOS transistor M53 has a gate connected to the gate of the second NMOS transistor M52, a drain connected to a third node C5, and a source connected to the ground. The fourth NMOS transistor M54 has a gate connected to a fourth node D5, a drain connected also to the fourth node D5, and a source connected to the ground. The fifth NMOS transistor M55 has a gate connected to the fourth node D5, a drain connected to the source of the sixth NMOS transistor M56, and a source connected to the ground. The sixth NMOS transistor M56 has a gate connected to the enable signal $C_{out}$, a source connected to the drain of the fifth NMOS transistor M55, and a drain serving as the output of the summing circuit $SC_i$ where the output current $I_{out}$ is obtained.

In the foregoing MOS-based circuit, the first NMOS transistor M51, the PMOS transistor Mp, and the first and second switching MOS transistors MS1, MS2 in combination constitute a first dynamic current mirror for integrating as it is received at the input port $I_{in}$.

Further, a first current source $2 \cdot I + I_a$ is formed between the system voltage $V_{DD}$ and the first node A5; a second current source $I_a$ is formed between the second node B5 and the ground; and a second current source I is formed between the system voltage $V_{DD}$ and the third node C5. Further, the second NMOS transistor M52, the PMOS transistor Mp, and the third switching MOS transistor MS3 in combination constitute a second dynamic current mirror for holding the generated integration current $I_f$. The current $I_f$, which flows from the third node C5 to the fourth node D5, is related to the input current $I_{in}$ by the following transfer function:

$$I_f = (I_{in} \times z^{-1})/(1 - z^{-1})$$

The fourth and the fifth NMOS transistor M54 and M55 in combination are capable of duplicating the integration current $I_f$ at the fifth node E5. Then, at the time the sixth NMOS transistor M56 is switched on by $C_{out}$, the duplicated version of the integration current $I_f$ is outputted from the output port $I_{out}$ of the summing circuit $SC_i$. The outputted current $I_{out}$ from each $SC_i$ represents the sum of the sequentially received input currents $I_{O\ ij}$, j=1 to m.

In FIG. 1, the output current $I_{out}$ from the first summing circuit $SC_1$ is denoted by $I_1$; the output current $I_{out}$ from the second summing circuit $SC_2$ is denoted by $I_2$; and so forth. These output currents $I_1, I_2, \ldots, I_n$ from the summing circuit array 230 are then transferred together to the maximum-value determination circuit 240 which is capable of determining which of these output currents $I_1, I_2, \ldots, I_n$ has the maximum magnitude.

Figure 6:
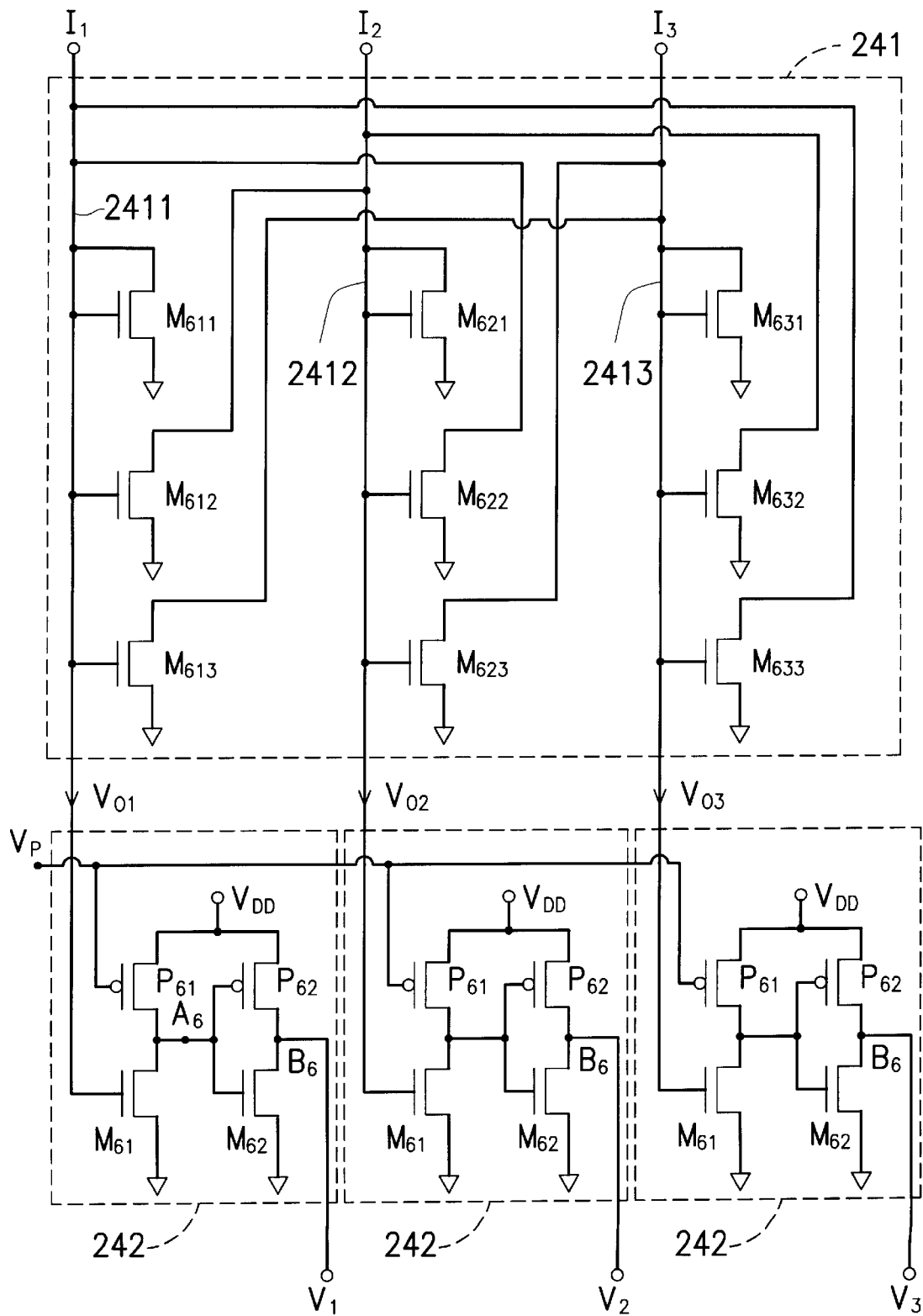
FIG. 6 is a schematic diagram showing the inside structure of a maximum-value determination circuit used in the switched-current fuzzy processor of FIG. 1.

Referring to FIG. 6, the maximum-value determination circuit 240 includes a winner-take-all (WTA) circuit 241 and an array of non-linear conversion circuits 242. To simplify the description, the maximum-value determination circuit 240 of FIG. 6 is drawn for the case of n=3.

The output currents from the summing circuit array 230 (i.e., $I_1, I_2, I_3$ in the case of n=3) are first received by the WTA circuit 241 which has three output ports $V_{O1}, V_{O2}, V_{O3}$ respectively associated with the three received currents $I_1, I_2, I_3$. The WTA circuit 241 operates in such a manner that only the one of the three output ports $V_{O1}, V_{O2}, V_{O3}$ that is associated with the one of the three received currents $I_1, I_2, I_3$ with the maximum magnitude will be switched to a high-voltage state with the other output ports being set to a low-voltage state (as implied by the name winner-take-all). For instance, if $I_1$ has the maximum magnitude, then $V_{O1}$ will be switched to a high-voltage state while $V_{O2}$ and $V_{O3}$ will be switched to a low-voltage state; if $I_2$ has the maximum magnitude, then $V_{O2}$ will be switched to a high-voltage state while $V_{O1}$ and $V_{O3}$ will be switched to a low-voltage state; and if $I_3$ has the maximum magnitude, then $V_{O3}$ will be switched to a high-voltage state while $V_{O1}$ and $V_{O2}$ will be switched to a low-voltage state.

The WTA circuit 241 includes, in the case of n=3, three sets of NMOS transistors respectively associated with the input currents $I_1, I_2, I_3$, including a first set of NMOS transistors M611, M612, M613 associated with the input current $I_1$; a second set of NMOS transistors M621, M622, M623) associated with the input current $I_2$; and a third set of NMOS transistors M611, M612, M613 associated with the input current $I_{13}$. Further, the three input currents $I_1, I_2, I_3$ are connected respectively via the lines 2411, 2412, 2413 to the output ports $V_{O1}, V_{O2}, V_{O3}$.

The first set of NMOS transistors M611, M612, M613 are connected in such a manner that the gates thereof are all connected to the $I_1$ line 2411; the sources thereof are all connected to the ground; and the drain of the NMOS transistor M611 is connected to the $I_1$ line 2411, the drain of the NMOS transistor M612 is connected to the $I_2$ line 2412, and the drain of the NMOS transistor M613 is connected to the $I_3$ line 2413.

The second set of NMOS transistors M621, M622, M623 are connected in such a manner that the gates thereof are all connected to the $I_2$ line 2412; the sources thereof are all connected to the ground; and the drain of the NMOS transistor M621 is connected to the $I_2$ line 2412, the drain of the NMOS transistor M622 is connected to the $I_1$ line 2411, and the drain of the NMOS transistor M623 is connected to the $I_3$ line 2413.

The third set of NMOS transistors M631, M632, M633 are connected in such a manner that the gates thereof are all connected to the $I_3$ line 2413; the sources thereof are all connected to the ground; and the drain of the NMOS transistor M631 is connected to the $I_3$ line 2413, the drain of the NMOS transistor M632 is connected to the $I_2$ line 2412, and the drain of the NMOS transistor M633 is connected to the $I_1$ line 2411.

All of these NMOS transistors M611, M612, M613, M621, M622, M623, M611, M612, M613 have the same specifications in electrical characteristics. The one of the three input currents $I_1$, $I_2$, $I_3$ with the maximum magnitude will cause the associated one of the output ports $V_{O1}$, $V_{O2}$, $V_{O3}$ to be switched to a high-voltage state while switching all the other output ports to a low-voltage state.

The output ports $V_{O1}$, $V_{O2}$, $V_{O3}$ of the WTA circuit 241 are coupled to the conversion circuits 242. All of the conversion circuits 242 have the same circuit structure, including a first NMOS transistor M61 whose gate is connected to the associated one of the three voltage outputs $V_{O1}$, $V_{O2}$, $V_{O3}$ from the WTA circuit 241, whose source is connected to the ground, and whose drain is connected to a first node A6; a second NMOS transistor M62 whose gate is connected to a fixed voltage $V_p$, whose source is connected to the system voltage $V_{DD}$, and whose drain is connected to the first node A6; a second PMOS transistor P62 whose gate is connected to the first node A6, whose source is connected to the system voltage $V_{DD}$, and whose drain is connected to a second node B6; and a second NMOS transistor M62 whose gate is connected to the first node A6, whose source is connected to the ground, and whose drain is connected to the second node B6. The potential at the second node B6 is then taken as the output of each of the conversion circuits 242. The outputs from the three conversion circuits 242 in the array 242 are respectively denoted by $V_1$, $V_2$, $V_3$ which represent the output of the switched-current fuzzy processor of the invention.

Each of the conversion circuits 242 operates in such a manner that the output thereof is at a high-voltage logic state provided that the potential at the gate of the first NMOS transistor M61 is higher than the threshold voltage $M_t$ thereof, and a low-voltage logic state otherwise.

The foregoing disclosed switched-current fuzzy processor of the invention has several advantages over the prior art. Firstly, the circuits in the simulation unit 200 (i.e., the MFG array 210, the weight-adjusting circuit array 220, the summing circuit array 230, and the maximum-value determination circuit 240) are all based on the switched-current mode of operation without the need to use current-to-voltage conversion means, thus allowing the switched-current fuzzy processor of the invention to have simplified circuit structure and high precision in fuzzy logic processing with high performance. Secondly, the provision of the weight-adjusting and summing means in the switched-current fuzzy processor of the invention in place of the MIN-MAX means in the prior art allows the switched-current fuzzy processor of the invention to be adjustable in weight with simplified operation.

The invention has been described using exemplary preferred embodiments. However, it is to be understood that the scope of the invention is not limited to the disclosed embodiments. On the contrary, it is intended to cover various modifications and similar arrangements. The scope of the claims, therefore, should be accorded the broadest interpretation so as to encompass all such modifications and similar arrangements.

What is claimed is:

1. A switched-current fuzzy processor, which comprises:

means for decoding a feature input into a set of binary feature signals;

an array of MFGs, coupled to said decoding means, for obtaining a set of current outputs whose magnitudes are proportional to the values of the feature signals respectively;

weight-adjusting means, coupled to said MFG array, for applying a predetermined weight factor in binary form to the output currents from said MFG array, wherein the weight-adjusting means comprising a plurality of proportional current mirrors, each being associated with one of the bits in the binary-coded weighted factor and having an output connected to a common current output line;

summing means, coupled to said weight-adjusting means, for summing up each set of currents from each column of the MFGs in said MFG array to thereby obtain a total value for the currents therefrom; and a maximum-value determination circuit, coupled to said summing means, capable of obtaining the one of the currents with the maximum magnitude from said summing means.

2. The switched-current fuzzy processor of claim 1, wherein each of the MFGs in said MFG array comprises:

a plurality of proportional current mirrors, each being associated with one of the bits in the feature signal and having an output connected to a common current output line.

3. The switched-current fuzzy processor of claim 2, wherein each of said proportional current mirrors comprises:

a first NMOS transistor whose gate is connected to the associated one of the bits in the feature signal, whose source is connected to the ground, and whose drain is connected to a first node;

a second NMOS transistor whose source is connected to the first node connected to the drain of said first NMOS transistor and whose gate and drain are tied together and connected to a second node;

a third NMOS transistor whose source and gate are tied together and connected to the second node and whose drain is connected to a system voltage; and a PMOS transistor whose gate is connected to the second node, whose source is connected to the system voltage, and whose drain is taken as the current output port of said proportional current mirror.

4. The switched-current fuzzy processor of claim 1, wherein each of said proportional current mirrors comprises:

a common first NMOS transistor whose gate and drain are tied together and connected to receive one of the currents from said MFG array;

a second NMOS transistor whose gate is connected to the gate of said first NMOS transistor and whose source is connected to the ground;

a third NMOS transistor whose gate is connected to the associated one of the bits in the binary-coded weight factor and whose source is connected to the drain of said second NMOS transistor;

a first PMOS transistor whose gate and drain are tied together and connected to the drain of said third NMOS transistor and whose source is connected to a system voltage; and a fifth PMOS transistor whose gate is connected to the gate of said first MOS transistor, whose source is connected to the system voltage, and whose drain is taken as the output of said proportional current mirror.

5. A switched-current fuzzy processor, which comprises:

means for decoding a feature input into a set of binary feature signals;

an array of MFGs, coupled to said decoding means, for obtaining a set of current outputs whose magnitudes are proportional to the values of the feature signals respectively;

weight-adjusting means, coupled to said MFG array, for applying a predetermined weight factor in binary form to the output currents from said MFG array;

summing means, coupled to said weight-adjusting means, for summing up each set of currents from each column of the MFGs in said MFG array to thereby obtain a total value for the currents therefrom, wherein said summing means includes an array of summing circuits, each summing circuit being used to sum up the currents from the MFGs in one column of said MFG array, each summing circuit comprising:

an input port which takes on the sequentially outputted weighted currents from said weight-adjusting means;

transistor at least three switching MOS transistors including a first switching MOS, a second switching MOS transistor, a third switching MOS transistor;

six NMOS transistors including a first NMOS transistor, a second NMOS transistor, a third NMOS transistor, a fourth NMOS transistor, a fifth NMOS transistor, and a sixth NMOS transistor; and one PMOS transistor; wherein said first switching MOS transistor is connected between the input port and a first node, with the ON/OFF state thereof controlled by a first clock signal;

said second switching MOS transistor is connected between the gate of said first NMOS transistor and a second node, with the ON/OFF state thereof also controlled by the first clock signal;

said third switching MOS transistor is connected between the second node and both the gate of the second NMOS transistor and the gate of the third NMOS transistor, with the ON/OFF state thereof also controlled by a second clock signal which is complement to the first clock signal;

said PMOS transistor has a gate connected to a fixed voltage, a source connected to the first node, and a drain connected to the second node;

said first NMOS transistor has a gate connected to said second switching MOS transistor, a drain connected to the first node, and a source connected to the ground;

said second NMOS transistor has a gate connected to both said third switching MOS transistor and the gate of said third NMOS transistor, a drain connected to the first node, and a source connected to the ground;

said third NMOS transistor has a gate connected to the gate of said second NMOS transistor, a drain connected to a third node, and a source connected to the ground;

said fourth NMOS transistor has a gate connected to a fourth node, a drain connected also to the fourth node, and a source connected to the ground;

said fifth NMOS transistor has a gate connected to the fourth node, a drain connected to the source of said sixth NMOS transistor, and a source connected to the ground; and said sixth NMOS transistor has a gate connected to the enable signal, a source connected to the drain of said fifth NMOS transistor, and a drain serving as the output of said summing circuit; and a maximum-value determination circuit, coupled to said summing means, capable of obtaining the one of the currents with the maximum magnitude from said summing means.

6. A switched-current fuzzy processor, which comprises:

means for decoding a feature input into a set of binary feature signals;

an array of MFGs, coupled to said decoding means, for obtaining a set of current outputs whose magnitudes are proportional to the values of the feature signals respectively;

weight-adjusting means, coupled to said MFG array, for applying a predetermined weight factor in binary form to the output currents from said MFG array;

summing means, coupled to said weight-adjusting means, for summing up each set of currents from each column of the MFGs in said MFG array to thereby obtain a total value for the currents therefrom; and a maximum-value determination circuit, coupled to said summing means, capable of obtaining the one of the currents with the maximum magnitude from said summing means, wherein the maximum-value determination circuit comprises:

a WTA circuit coupled to receive the output currents from said respective summing circuits in said summing means, said WTA circuit having a number of output ports respectively corresponding to the received currents from said summing means, wherein the one of the output ports corresponding to the one of the received currents with the maximum magnitude is at a first voltage state, with all the other output ports being at a second voltage state; and an array of non-linear conversion circuits coupled respectively to the output ports of said WTA circuit.

7. The switched-current fuzzy processor of claim 6, wherein said WTA circuit comprises:

a number of sets of MOS transistors, each being associated with one of the output currents from said summing means;

wherein each set of MOS transistors are connected in such a manner that the gates thereof are all connected to the associated current line; the sources thereof are all connected to the ground; and the drains thereof are connected respectively to all the current lines associated with the output currents from said summing means.

8. The switched-current fuzzy processor of claim 6, wherein each of said conversion circuits comprises:

a first NMOS transistor whose gate is connected to the associated one of the voltage outputs from said WTA circuit, whose source is connected to the ground, and whose drain is connected to a first node;

a second NMOS transistor whose gate is connected to a fixed voltage, whose source is connected to the system voltage, and whose drain is connected to the first node;

a second PMOS transistor whose gate is connected to the first node, whose source is connected to the system voltage, and whose drain is connected to a second node; and a second NMOS transistor whose gate is connected to the first node, whose source is connected to the ground, and whose drain is connected to the second node;

wherein the potential at the second node is then taken as the output of each of said conversion circuits; and each of said conversion circuits operates in such a manner that the output thereof is at a high-voltage logic state provided that the potential at the gate of said first NMOS transistor is higher than the threshold voltage thereof, and a low-voltage logic state otherwise.

* * * * *